United States Patent [19]

Loney-Crawford

[11] Patent Number: 5,612,415

[45] Date of Patent: Mar. 18, 1997

[54] PROCESS FOR COATING A SUBSTRATE WITH COATINGS INCLUDING HIGH TG ACRYLIC POLYMERS AND COATED ARTICLE OBTAINED THEREBY

[75] Inventor: Faith S. Loney-Crawford, Detroit, Mich.

[73] Assignee: BASF Corporation, Southfield, Mich.

[21] Appl. No.: 434,736

[22] Filed: May 4, 1995

Related U.S. Application Data

[62] Division of Ser. No. 282,405, Jul. 28, 1994.

[51] Int. Cl.$^6$ ............................................ C08F 8/30
[52] U.S. Cl. ............................ 525/123; 427/385.5
[58] Field of Search .................. 515/123; 427/385.5

[56] References Cited

U.S. PATENT DOCUMENTS

| | | | |
|---|---|---|---|
| 5,279,862 | 1/1994 | Corcoran et al. | 427/407.1 |
| 5,286,782 | 2/1994 | Lamb et al. | 525/123 |
| 5,314,953 | 5/1994 | Corcoran et al. | 525/123 |

*Primary Examiner*—Bernard Lipman
*Attorney, Agent, or Firm*—Anne Gerry Sabourin

[57] ABSTRACT

The present invention is a two-component coating composition comprising an acrylic polymer having a $T_g$ between 53° C. and 86° C. and a diisocyanate crosslinker. The crosslinking agent is preferably the isocyanurate of hexamethylene diisocyanate, derivatives thereof, biurets of the isocyanurate of hexamethylene diisocyanate and derivatives thereof. The coating composition exhibits excellent durability and resistance to environmental etch.

10 Claims, No Drawings

PROCESS FOR COATING A SUBSTRATE WITH COATINGS INCLUDING HIGH TG ACRYLIC POLYMERS AND COATED ARTICLE OBTAINED THEREBY

This is a divisional of copending application Ser. No. 08/282,405 filed on Jul. 28, 1994.

FIELD OF THE INVENTION

The present invention relates to a polymeric composition suitable for producing a cured coating resistant to environmental etch, a process for coating the substrate with the composition, and to a substrate having a coating which is resistant to environmental etching. In particular, the present invention pertains to acrylic polymers and two-component coatings containing these polymers.

BACKGROUND OF THE INVENTION

The use of addition polymers such as acrylic polymers in coatings formulations, particularly in topcoats for the automotive market, has been widespread. One of the primary requirements of such a coating for the automotive market is that it be durable. That is, the coating must resist degradation due to environmental elements which it comes into comes into contact with, such as sunlight, gasoline, and environmental fallout such as dew, rain, or particulate matter of any kind. It has been recognized that prior art coating compositions are deficient in their ability to withstand degradation from elements which have generally been lumped together in the category of "environmental" causes of degradation. This sort of degradation has manifested itself in an etching or pitting of the coating's surface, and has resulted in the necessity of the automotive manufacturers to repair the coatings under warranty claims. However, in spite of the recognized deficiencies of prior art polymers and coating compositions, as well as the economic penalty of such deficiencies, a long felt need for such a polymer for producing a cured topcoat resistant to environmental etch has heretofore gone unsatisfied.

In the field of automotive coatings, it has become an objective to obtain a topcoat or clearcoat of a color-plus-clear composite coating that is resistant to being etched by environmental fallout. A color plus clear composite coating refers to a multi-layer coating applied to a surface, particularly an automotive vehicle surface, where at least one pigmented coating is applied to a surface and at least one substantially transparent coating (i.e. clearcoat) is applied over the pigmented coating layer.

Currently automotive clearcoats may comprise one component or two-component coating compositions. One-component compositions include all components in one mixture and react to crosslink at relatively high temperatures in the presence of a catalyst. Two-component compositions comprise two or more reactive solutions or dispersions which react upon contact and therefore must be mixed immediately before being applied to a substrate.

One component compositions that use a melamine crosslinker are widely used, but demonstrate unsatisfactory environmental etch resistance when used in cured automotive clearcoats. Also, melamine systems split off a by-product upon crosslinking. This by-product is usually a low molecular weight organic solvent, which adds to the volatile organic compounds (i.e., VOC's) which are released (or captured) during the coating process. Further, the small organic compounds released may become involved in undesirable reactions with other components in the composition or with components present in adjacent coatings.

One component compositions comprising a blocked isocyanate crosslinking agent also exhibit several disadvantages. First, the presence of the blocking agent produces the need to utilize proportionally more solvent/dispersant, because the blocking agent enhances the size of the crosslinker, requiring more solvent or dispersant. Second, upon deblocking, the blocking agent is volatilized, thus increasing the volatile organic compounds (VOC) present in the coating, when compared to the unblocked two component compositions. Third, the release of the blocking agent in one component composition places a mobile species into the film. The presence of this mobile blocking agent can be a detriment, since it could potentially react with other species present in the film or in an adjacent uncured film layer which may be also present. Fourth, the deblocking agent represents a cost which must be borne by the manufacturer and user of the blocked isocyanate composition. Finally, the use of a blocking agent requires that the composition be brought to a higher temperature than is required for the curing of two component compositions. The use of higher temperatures for the curing operation is undesirable because it requires the input of greater energy (i.e., it is expensive), and because it can result in deformation of plastic automotive body panels during the curing step.

The two-component composition, process, and coating of the present invention are novel in that they achieve excellent etch resistance using an acrylic polymer having a high glass transition temperature ($T_g$). It is unexpected that a high $T_g$ acrylic based on high $T_g$ monomers would provide good resistance to environmental etch, as such an acrylic would be expected to be very brittle and too fragile for automotive coating application. Further, when a polymer contains a high $T_g$ monomer such as styrene in an amount greater than about 25 weight percent, a detrimental "loss of gloss" (i.e. chalking) may result. Such a loss of gloss is considered to be a form of coating deterioration which is completely different from environmental etching.

SUMMARY OF THE INVENTION

The present invention provides a two-component coating composition suitable for coating a substrate and a process of coating a substrate with the composition which produces cured coatings resistant to environmental etch.

The composition of the present invention includes i) a film forming acrylic polymer which has a glass transition temperature ($T_g$) between 53° C. and 86° C., the film comprising at least one reactive polymer functionality, i.e., a functionality that is reactive with one or more functional groups present on the crosslinker(s) and ii) a crosslinking agent selected from the group consisting of a polyisocyanates and mixtures thereof. The coating composition may include any suitable polyisocyanate crosslinking agent which gives the required etch resistance. Preferably the crosslinker is selected from trifunctional aliphatic isocyanurates, isocyanurates of aliphatic diisocyanates and mixtures thereof.

Further disclosed is a process for coating a substrate. In general, this process comprises applying the two-component composition of the present invention described herein above to a substrate, so that a film is formed on the substrate, and subsequently curing the film, whereby a cured coating is produced on the substrate.

The present invention also relates to a cured coating on a substrate. The cured coating can be produced by using the composition of the present invention in the process as set forth in the preceding paragraph. The cured coating includes a crosslinked polymeric network, that includes at least one polymeric residue and at least one crosslinker residue. Preferably the coating of the present invention includes a crosslinker residue of a trifunctional aliphatic isocyanurate or an isocyanurate of an aliphatic diisocyanate, or mixtures thereof, in combination with a high $T_g$ acrylic polymeric residue.

The two-component coating composition described herein, demonstrates improved performance over other two-component coating compositions in resistance to environmental etching and damaging effects from sunlight. The coating demonstrates good gloss and distinctness of image. The present invention provides a two-component composition suitable for forming an automotive grade coating.

DETAILED DESCRIPTION OF THE INVENTION

The composition of the present invention is a two-component composition. As used herein, the phrase "two-component" refers to the number of solutions and/or dispersions which are mixed together. Once the components are mixed together, they are generally applied to a substrate as quickly as possible. For example, typically the components are mixed together immediately upstream of the nozzle of a sprayer which thereafter immediately atomizes the mixture into a mist which is directed at a substrate which is being coated with a film of the mixture. In contrast to a two-component composition, a one- component composition is a single solution or dispersion which forms a film which is cured via heating, without the use of any other solution or dispersion. Two-component compositions are required if compounds within each of the components will react to form a crosslinked product at room temperature in a container.

The coating composition of the present invention comprises i) in one component an acrylic polymer having a glass transition temperature of between 53° C. and 86° C. having a reactive functionality for reaction with a crosslinker, and ii) in a second component a polyisocyanate crosslinker. The coating composition may include any suitable polyisocyanate crosslinking agent which gives the required etch resistance.

The invention further includes a process for coating a substrate using the coating composition of the present invention, and a coated substrate, wherein the resultant cured film of the coating composition provides excellent resistance to environmental etch.

The glass transition temperature of the acrylic polymer of the present invention is between 53° C. and 86° C., and preferably, between 63° and 86° C. The polymer utilized in the process and product of the present invention is polymerized from any monomers which provide an acrylic polymer having a $T_g$ in the range of 53° to 86° C. Examples of monomers which can be polymerized to form such an acrylic polymer include, but are not limited to, monomers selected from the group consisting of styrene, methyl methacrylate, cyclohexyl methacrylate, isobornyl methacrylate, hydroxy propyl methacrylate, acrylic acid, ethyl hexyl acrylate and mixtures thereof.

A polymer having a $T_g$ within the range of the present invention may be obtained by reacting styrene, in an amount between 20% and 45% by weight, cyclohexyl methacrylate, in an amount between 5% and 25% by weight, hydroxypropyl methacrylate in an amount between 10 and 50% by weight, ethyl hexyl acrylate, in an amount between 1.0 and 25% by weight, and acrylic acid, in an amount between 0.5 and 10% by weight, where all weight percentages are based on weight of the total non-volatile content of the polymer.

Another example of an acrylic polymer having a $T_g$ of between 53° and 86° C. is obtained by reacting at least 20% by weight styrene, preferably between 25% and 45% styrene and cyclohexyl methacrylate present in an amount between 5% and 25% by weight, methyl methacrylate present in an amount between 10% and 40% by weight and isobornyl methacrylate present in an amount between 5% and 35% by weight, where all percentages are based on weight of the total non-volatile content of the polymer.

Another high $T_g$ acrylic polymer can be the reaction product of cyclohexyl methacrylate present in an amount between 10% and 25% by weight, methyl methacrylate present in an amount between 15% and 30% by weight and isobornyl methacrylate present in an amount between 10% and 25% by weight, where all percentages are based on weight of the non-volatile content of the polymer.

These formulations are included to illustrate possible acrylic polymers having a $T_g$ range of between 53° and 86° C. The invention is not limited to specific acrylic polymer formulations, but only to acrylic polymers within the specified $T_g$ range.

The polymer has a functionality capable of undergoing crosslinking after polymerization. The functionality is preferably either hydroxyl functionality or amine functionality. Most preferably the reactive functionality is hydroxyl. The result of this polymerization is a "reactive polymer" in that the polymer, when used in a coating composition, can thereafter react with a crosslinker (i.e., any species which reacts to bridge two polymer molecules) during a curing step in the process, whereby a cured coating is produced.

In general, the polymer has a number average molecular weight ranging from about 3,000 to about 20,000, preferably from about 3,000 to 10,000 and most preferably about 3,000 to 5,000. The polymer has an average number of functional sites capable of undergoing crosslinking of from about 5 to 100, and preferably from about 5 to about 30 per polymer molecule. The polymer has a theoretical $T_g$ ranging from about 53° C. to about 86° C., and preferably from about 63° C. to about 86° C. If the polymer is incorporated in a coating composition with other reactive components, the polymer is preferably present in an amount of from about 35 to about 85, more preferably from about 50 to about 80 weight percent of a total amount of reactive components present in the coating composition. The term "reactive components" as used herein encompasses the polymer of the invention and the crosslinker, as well as any other species present which can react with either the polymer or the crosslinker during the curing step to become a part of the crosslinked network.

The polymer may be prepared using conventional techniques such as by heating the monomers in the presence of a polymerization initiating agent and optionally chain transfer agents. The polymerization may be carried out in bulk or in solution using conventional solvents such as toluene, ethyl acetate, acetone, methyl isobutyl ketone, methyl ethyl ketone, methyl amyl ketone, mineral spirits, ethylene glycol monoethers acetates and other aliphatic, cycloaliphatic and aromatic hydrocarbons, esters, ethers, ketones and other compatible solvents.

Typical initiators are organic peroxides such as dialkyl peroxides, peroxyesters, peroxydicarbonates, diacyl peroxides, hydroperoxides, and peroxyketals; and azo compounds such as 2,2' azobis(2-methylbutanenitrile) and 1,1'-azobis- (cyclohexanecarbonitrile). Typical chain transfer agents are mercaptans such as octyl mercaptan, n- or tert-dodecyl mercaptan; halogenated compounds; thiosalicylic acid, mercaptoacetic acid, mercaptoethanol, and dimeric alpha-methyl styrene.

The reaction is usually carried out at temperatures from about 20° C. to about 200° C. The reaction may conveniently be done at the temperature at which the solvent or solvent mixture refluxes, although with proper control a temperature below the reflux may be maintained. The initiator should be chosen to match the temperature at which the reaction is carried out, so that the half-life of the initiator at that temperature should preferably be no more than thirty minutes.

The solvent or solvent mixture is generally heated to the reaction temperature and the monomers and initiator(s) are added at a controlled rate over a period of time, usually between 3 and 6 hours. A chain transfer agent or additional solvent may be added concurrently with the monomers and initiator(s). The mixture is usually held at the reaction temperature after the additions are completed for a period of time to complete the reaction. Optionally, additional initiator may be added to ensure complete conversion. The polymer should have a uniform molecular weight distribution which is evidenced by polydispersity values which are preferably less than 4, more preferably from 1.5 to 2.5.

In order to form a cured coating, the polymer is crosslinked utilizing a second component containing a crosslinker which reacts, essentially on contact, with the polymeric component. The crosslinker must have at least two functional sites which are reactive with the polymer, and the crosslinker may be either monomeric or polymeric in nature. Polyisocyanates are the preferred crosslinking agent. The coating composition may include any suitable polyisocyanate crosslinking agent which gives the required etch resistance. Preferably the crosslinker is a trifunctional aliphatic isocyanurate or isocyanurate of a aliphatic diisocyanate. Examples of suitable isocyanurates of aliphatic diisocyanates include isocyanurates of hexamethylene diisocyanate and derivatives thereof, biurets of hexamethylene diisocyanate and derivatives thereof, isocyanurates of isophorone diisocyanate and derivatives thereof, biurets of isophorone diisocyanate and derivatives thereof and any combination of these. Most preferred for purposes of the present invention are isocyanurates of hexamethylene diisocyanate and derivatives thereof, biurets of hexamethylene diisocyanate and derivatives thereof. By derivatives of isocyanurates of these diisocyanates is meant a derivative which can also act as a crosslinker to crosslink a film. Such derivatives could include, for example, an acid functional or epoxy functional derivative of hexamethylene diisocyanate or isophorone diisocyanate. Examples of these isocyanurates are set forth in U.S. Pat. No. 5,238,999 to Cook, which is hereby incorporated by reference.

Also suitable as crosslinking agents are any other polyisocyanates which provide suitable etch resistance, as there are several new isocyanate crosslinkers which have shown promising results, but are not yet in widespread usage. These include trifunctional aliphatic isocyanurates and isocyanurates of aliphatic diisocyanates in development at the time of this application. One such example is his (4-isocyanato cyclohexyl) methane.

If the polymer has hydroxyl sites, the amount of crosslinking agent utilized ranges from about 15 to about 60 percent by weight of the reactive components. The coating composition of the present invention, once applied and formed into a film on a substrate but not yet baked, is present on the substrate in the form of an uncured coating.

As stated above, the polymer present in the composition of the present invention has one or more functional groups thereon, which functional groups are reactive with the functionalities (i.e., functional groups) present on the crosslinker. As also stated above, the crosslinker(s) present have two or more functionalities thereon which react with the reactive functionalities on the polymer molecule. As used herein, the phrase "equivalents ratio," as applied to the ratio of the polymer to one or more crosslinkers, represents the ratio of the equivalents of reactive functional groups present on the polymer to the equivalents of reactive functional groups present on the crosslinker. Preferably, the composition of the present invention comprises the polymer and crosslinker in an equivalents ratio, based on a ratio of crosslinker reactive functionality to polymer reactive functionality, of from about 1.6:1 to about 0.4:1. The 1.6:1 ratio, for example, specifies that there are 16 reactive functional sites on crosslinker for every 10 reactive functional sites on the polymer. Still more preferably, the composition of the present invention comprises the polymer and crosslinker in an equivalents ratio, based on a ratio of crosslinker functionality to polymer functionality, of from about 1.4:1 to about 0.8:1. Most preferably, the composition of the present invention comprises the polymer and crosslinker in an equivalents ratio, of about 1:1.

The composition of the present invention may further comprise any additional ingredient which imparts any desired characteristic to the composition, or to the process, or to the cured coating made therefrom. Such additional ingredients comprise theology control agents, leveling agents, catalysts, cure inhibiting agents, anti-yellowing agents, ultraviolet absorbers, free radical scavengers, and anti-cratering agents.

In the process of the present invention, a two component composition is made as described above, following which the two component composition is applied to a substrate so that a film is formed on the substrate. The film is subsequently cured, whereby a cured coating is produced. As used herein, the phrase "applying the two component composition to a substrate" includes the step of mixing the two components to a degree of substantial uniformity. This typically occurs immediately prior to the spray nozzle in a spray application device.

The substrate to which the coating composition of this invention is to be applied may be, for example, metal, ceramic, plastic, glass, paper, or wood. The substrate may also be any of the aforementioned materials precoated with this or another coating composition. The coating compositions of this invention have been found to be particularly useful over precoated steel or plastic substrates in automotive applications. The coating composition of the present invention may be opaque or transparent, and may or may not contain pigment. The coating may be used in a process where it is a first coating on the substrate, an intermediate coating on the substrate, or the uppermost coating on the substrate. It is preferable that the coating is both substantially transparent and substantially colorless. It is also preferred that the coating composition be used to form the uppermost coating on the substrate. The coating is particularly useful for automotive substrates, where a substantially transparent coating, known in the art as a clearcoat, is applied over at least one pigmented coating layer. This multi-layer coating is known as a color-plus-clear composite coating.

After application of the coating composition to the substrate, the coating is cured, preferably by heating at a temperature and for a length of time sufficient to cause the conversion of all or nearly all of the reactive groups. The cure temperature is usually from 115° C. to 160° C., and the length of cure is usually 15 minutes to 60 minutes. Preferably, the coating is cured at 120°–145° C. for 20 to 30 minutes. The thickness of the cured coating can be from 1 to 150 microns, but when used as an automotive clearcoat the coating thickness is generally from 32 to 50 microns.

The basecoat may be cured before the clearcoat is applied or the basecoat may be given a wet-on-wet application of a clearcoat. By the term "wet-on-wet" it is meant that after application the basecoat is allowed to flash, or dry, to remove most of the water and other solvent that it contained, but it is not cured before the clearcoat composition is applied. After the clearcoat composition is applied, it is allowed to flash or dry for a period of time, then the basecoat and the clearcoat are cured together.

The clearcoat does not necessarily need to use the cure mechanism used by the basecoat, although the cure mechanisms used must not interfere with one another. The basecoat may be applied in one or two layers, with a short period between application of layers to allow solvent and water to evaporate (termed a "flash" period). After application, the basecoat may be further dried, preferably at a slightly elevated temperature, as in a 120° F. oven, for a period of 5 to 20 minutes before the clear coat composition is applied. The clearcoat composition is preferably applied by spraying, in one layer, or preferably two layers with a short flash between layers. The clearcoat composition is allowed to flash under ambient or heated conditions for 1–20 minutes. The uncured coatings are then cured, usually by thermoset methods as described hereinabove. The resulting appearance and physical properties are excellent.

In the following examples, coatings were prepared from the polymers and compositions of the present invention, and subjected to test procedures to determine and illustrate the susceptibility of the coating to environmental etching.

The following test procedures were conducted on coated panels and the test results are reported in Tables 1–4 of the Examples.

A QUV exposure test was conducted to evaluate coating performance upon exposure to ultraviolet radiation. The test is performed by exposing panels, prepared with standard black basecoat and a clearcoat, to a ultraviolet radiation from an FS-40 bulb using a Q-Panel QUV cabinet and evaluating the panels at 500 hour intervals over a period of 4000 hours.

A SUGA exposure test was conducted to evaluate coating performance upon exposure to more intensive ultraviolet radiation than that of the QUV test. The test is performed by exposing panels, as described above, to ultraviolet radiation from a SUGA FS-40 bulb and evaluating the panels at 500 hour intervals over a period of 3000 hours.

The WOM test is designed to accelerate extreme environmental conditions encountered outside a vehicle due to sunlight heat and moisture, to predict the performance of automotive coatings. The ultraviolet radiation is from a Xenon Arc type bulb, either type AH or BH and from a carbon arc bulb. The test is conducted over an extended period of time, with cycles of light exposure and darkness, where the temperature and relative humidity is varied and a spray of deionized water is applied to the front of the panels during part of the light cycle and spray is applied to the back of the panels during part of the dark cycle.

Field etch resistance was tested by actual outdoor exposure at sites known for their heavy environmental fallout. Panels measuring 10×10 were prepared as described above for evaluation for resistance to environmental etch. The panels were exposed horizontally at a 0° angle on elevated open racks for 3 months. Visual evaluations were done for pitting, spot-type etching and ring etching after 1, 2, and 3 months. The panels were rated on a scale from 0 to 10, with 0–3 corresponding to slight etching such as the onset of spotting observable by the trained eye; 4–7 corresponding to moderate etching such as spotting with the onset of erosion of the coating; 8–10 corresponding to severe indicating total etch failure, requiring refinishing of the coating.

The glass transition temperature ($T_g$) is described in PRINCIPLES OF POLYMER CHEMISTRY, Flory, Cornell University Press, Ithaca, N.Y., 1953, pages 52–57. The theoretical $T_g$ can be calculated as described by Fox in Bull. Amer. Physic Soc. Vol. 1, No. 2, page 123 (1956). The $T_g$ can be determined experimentally such as by using a penetrometer such as a DuPont 940 Thermomechanical Analyzer. The $T_g$ of the polymers as used herein refers to the calculated value unless otherwise indicated.

The present invention is further illustrated by the following non-limiting examples.

EXAMPLES

Example 1

Acrylic Polymer ($T_g$=86° C.)

A reactor was charged with a solvent mixture including 96% Solvesso®-100, (a mixed aromatic solvent from Ashland Chemical, Columbus, Ohio), and 4% n-butanol, based on total solvent weight and was heated to reflux (139° C.) under an inert atmosphere. After a reflux had been established, the inert gas was turned off and a mixture of monomers comprising 43.5% styrene, 15% cyclohexyl methacrylate, 40% hydroxypropyl methacrylate, 1.5% acrylic acid, were combined with 7% of initiator comprising t-butyl-peroxy acetate, (where percentages are based on total monomer weight), were added at a constant rate over a period of 3 hours. A gentle reflux was maintained throughout the addition. When all of the mixture had been added, 50 parts Solvesso®-100 were used to rinse the line and were added to the reaction vessel. The reflux (134° C.) was maintained for another hour and then the batch was cooled and filtered. The measured weight NV was 65%, the Gardner-Holt viscosity was Z6+, and the acid number was 15.66 mg KOH/g NV. The $M_n$ was 1436, the number average molecular weight ($M_w$) was 3394, and the polydispersity (D) was 2.36 as measured by GP versus a polystyrene standard. The theoretical $T_g$ of the polymer as calculated from the Fox equation was 86° C.

Example 2

Acrylic Polymer with $T_g$=72.5° C.

A suitable reactor was charged with a solvent mixture including 96% Solvesso®-100 and 4% n-butanol, where percentages are based on total solvent weight, and was heated to reflux under an inert atmosphere. After a reflux had been established, the inert gas was turned off and a mixture of monomers comprising 43.5% styrene, 15% cyclohexyl methacrylate, 35% hydroxypropyl methacrylate, 5% ethyl hexyl acrylate and 1.5% acrylic acid, were combined with and 7% t-butyl-peroxy acetate initiator, (percentages are based on total monomer weight), were added at a constant rate over a period of 3 hours. A gentle reflux was maintained throughout the addition. When all of the mixture had been added, 50 parts Solvesso®-100 were used to rinse the line and were added to the reaction vessel. The reflux was maintained for another hour and then the batch was cooled and filtered. The measured weight NV was 65.4%, the Gardner-Holt viscosity was Z6+, and the acid number was 15.60 mg KOH/g NV. The $M_n$ was 1349, the $M_w$ was 3471, and the polydispersity (D) was 2.5136 as measured by GP versus a polystyrene standard. The theoretical $T_g$ of the polymer as calculated from the Fox equation was 72.5° C.

Example 3

Acrylic Polymer $T_g$=65° C.

A suitable reactor was charged with a solvent mixture including 96% Solvesso®-100 and 4% n-butanol, where percentages are based on total solvent weight, and was heated to reflux under an inert atmosphere. After a reflux had been established, the inert gas was turned off and a mixture of monomers comprising 43.5% styrene, 15% cyclohexyl methacrylate, 31.5% hydroxypropyl methacrylate, 8.5% ethyl hexyl acrylate and 1.5% acrylic acid, were combined with and 7% t-butyl-peroxy acetate initiator, where all percentages are based on total monomer weight, were added at a constant rate over a period of 3 hours. A gentle reflux was maintained throughout the addition. When all of the mixture had been added, 50 parts Solvesso®-100 were used to rinse the line and were added to the reaction vessel. The reflux was maintained for another hour and then the batch was cooled and filtered. The measured weight NV was 64.9%, the Gardner-Holt viscosity was Z6+, and the acid number was 15.40 mg KOH/g NV. The $M_n$ was 2281, the $M_w$ was 3464, and the polydispersity (D) was 1.5182 as measured by GP versus a polystyrene standard. The theoretical $T_g$ of the polymer as calculated from the Fox equation was 65.0° C.

Example 4

Acrylic Polymer $T_g$=53° C.

A suitable reactor was charged with a solvent mixture including 96% Solvesso®-100 and 4% n-butanol, where percentages are based on total solvent weight, and was heated to reflux under an inert atmosphere. After a reflux had been established, the inert gas was turned off and a mixture of monomers comprising 35% styrene, 15% cyclohexyl methacrylate, 35% hydroxypropyl methacrylate, 13.5% ethyl hexyl acrylate and 1.5% acrylic acid, were combined with and 7% t-butyl-peroxy acetate initiator, where all percentages are based on total monomer weight, were added at a constant rate over a period of 3 hours. A gentle reflux was maintained throughout the addition. When all of the mixture had been added, 50 parts Solvesso®-100 were used to rinse the line and were added to the reaction vessel. The reflux was maintained for another hour and then the batch was cooled and filtered. The measured weight NV was 65.0%, the Gardner-Holt viscosity was Z6+, and the acid number was 13.5 mg KOH/g NV. The $M_n$ was 2119, the $M_w$ was 3480, and the polydispersity (D) was 1.6426 as measured by GP versus a polystyrene standard. The theoretical $T_g$ of the polymer as calculated from the Fox equation was 65.0° C.

Coating Compositions

Examples 5–10 describe coating compositions. All amounts are set forth in parts by weight, based on total weight of coating composition solids, unless otherwise specified.

Example 5

Coating Composition containing Polymer from Ex. 1

| | |
|---|---|
| Acrylic Polymer from Ex. 1 | 85.17 |
| Butyl Carbitol Acetate | 26.2 |
| Butyl cellosolve acetate | 26.2 |
| Flow Additive (Byk 320)[1] | 3.85 |
| Tinuvin 384B (Ultraviolet absorber)[2] | 3.0 |
| Tinuvin 123 (Hindered Amine Light Stabilizer)[3] | 1.5 |
| Unblocked Isocyanurate of Hexamethylene diisocyanate | 32.0 |

[1]From Byk Chemie of Detroit, Michigan.
[2]Tinuvin 384B, available from Ciba Geigy of Ardsley, New York.
[3]Tinuvin 123, available from Ciba Geigy of Ardsley, New York.

Example 6

Coating Composition containing Polymer from Ex. 2

| | |
|---|---|
| Acrylic Polymer from Ex. 2 | 99.3 |
| Butyl Carbitol Acetate | 27.0 |
| Butyl cellosolve acetate | 27.0 |
| Flow Additive (Byk 320) | 2.0 |
| Tinuvin 384B | 3.0 |
| Tinuvin 123 | 1.5 |
| Unblocked Isocyanurate of Hexamethylene diisocyanate | 38.93 |

Example 7

Coating Composition containing Polymer of Ex. 3

| | |
|---|---|
| Acrylic Polymer from Ex. 3 | 100.1 |
| Butyl Carbitol Acetate | 27.0 |
| Butyl cellosolve acetate | 27.0 |
| Flow Additive (Byk 320)[a] | 2.0 |
| Tinuvin 384B | 3.0 |
| Tinuvin 123 | 1.5 |
| Unblocked Isocyanurate of Hexamethylene diisocyanate | 38.93 |

Example 8

Coating Composition containing Polymer of Ex. 4

| | |
|---|---|
| Acrylic Polymer from Ex. 4 | 99.94 |
| Butyl Carbitol Acetate | 27.0 |
| Butyl cellosolve acetate | 27.0 |
| Flow Additive (Byk 320)[a] | 2.0 |
| Tinuvin 384B | 3.0 |
| Tinuvin 123 | 1.5 |
| Unblocked Isocyanurate of Hexamethylene diisocyanate | 38.93 |

Example 9

Comparative Example 2—Component Coating Composition

| | |
|---|---|
| Acrylic resin | 70.6 |
| Glycol ether ethylene butyl acetate | 7.36 |
| Diisobutyl ketone | 4.1 |
| Flow Additive (Byk 320)[a] | 3.15 |
| Tinuvin 384B | 2.59 |
| Tinuvin 123 | 1.23 |
| Glycol ether dibutyl acetate | 7.958 |
| n-Butyl acetate | 3.0 |
| Unblocked Isocyanurate of | 63.29 |

-continued

| | |
|---|---|
| isophorone diisocyanate | |
| Unblocked Isocyanurate of Hexamethylene diisocyanate | 22.69 |
| diisobutyl ketone | 14.02 |

Example 10

Comparative Example 1—Component Acrylic Melamine Clearcoating Composition

| | |
|---|---|
| Thermosetting Acrylic Resin[1] | 29.75 |
| High Solids Acrylic Resin[2] | 12.17 |
| Low Molecular weight Thermoset acrylic[3] | 12.73 |
| acid catalyst | 1.4 |
| Hindered Amine Light Stabilizer[4] | 1.01 |
| Ultraviolet absorber[5] | 1.86 |
| rheology control additive[6] | 10.09 |
| rheology control additive[7] | 6.8 |
| acrylic additive | 0.58 |
| flow additive | 0.17 |
| acrylic additive | 0.22 |
| Amino methyl propanol | 0.06 |
| Melamine crosslinker[8] | 21.70 |
| Glycol ether ethyl butyl acetate | 0.73 |
| Ethanol | 0.73 |

[1-3]Acrylic resins are disclosed in Pending U.S. Pat. application Ser. No. 07/699,297, filed 4/19/91.
[1-3]Acrylic resins are disclosed in Pending U.S. Pat. application Ser. No. 07/699,297, filed 4/19/91.
[4]Tinuvin 123, available from Ciba Geigy of Ardsley, New York.
[5]Tinuvin 384B, available from Ciba Geigy of Ardsley, New York.
[6]fumed silica dispersion
[7]fumed silica dispersion
[8]Resimine 755 from Monsanto Chemical Company of Springfield, Mass.

Physical Test Data

Tables 1–4 set forth physical test data for the above described coating compositions. For all tests the clearcoat compositions were applied over black basecoat and evaluated for gloss and surface defects after test exposure.

TABLE 1

QUV Test Results for Coating Compositions
Coatings were evaluated after exposure to UV radiation from an FS-40 bulb. The results are set forth in the following table.

| Coating Composition | Initial Gloss | Gloss per Exposure time (hours) | | | | Surface Defects by 3500 hours exposure* |
|---|---|---|---|---|---|---|
| | | 1000 | 2000 | 3000 | 4000 | |
| 5 | 84 | 86 | 86 | 89 | 75 | slight pitting slight cracking |
| 6 | 91 | 86 | 84 | 88 | 77 | moderate pitting |
| 7 | 91 | 87 | 85 | 82 | 73 | moderate pitting moderate waterspotting |
| 8 | 88 | 81 | 80 | 85 | 71 | slight pitting |
| 9 | 83 | 81 | 81 | 83 | 64 | moderate pitting moderate waterspotting |
| 10 | 86 | 73 | 63 | 41 | 18 | severe cracking |

*Surface defects noted by 3500 hours in Table 1 may have occured before 3500 hours exposure. Defects listed indicate the appearance observed at 3500 hours exposure.

TABLE 2

WOM Test Results for Coating Compositions
Coatings were evaluated following exposure to varied humidity and temperature as described above. Surface defects indicated by 2500 hours may have occured before 2500 hours exposure. Defects listed indicate the appearance observed at 2500 hours.

| Coating Composition | Initial Gloss | Gloss per Exposure Time (hours) | | | | Surface Defects by 2500 hours Exposure |
|---|---|---|---|---|---|---|
| | | 500 | 1000 | 2000 | 2500 | |
| 5 | 83 | 90 | 67 | 70 | 66 | severe delamination moderate chemical etch moderate pitting severe waterspotting |
| 6 | 91 | 90 | 67 | 69 | 69 | moderate delamination moderate chemical etch moderate pitting severe waterspotting |
| 7 | 91 | 89 | 70 | 71 | 70 | slight delamination moderate chemical etch moderate pitting severe waterspotting |
| 8 | 87 | 87 | 72 | 72 | 72 | severe delamination moderate chemical etch moderate pitting severe waterspotting |
| 9 | 83 | 81 | 56 | 62 | 62 | moderate delamination moderate chemical etch moderate pitting severe waterspotting |
| 10 | 84 | 81 | 45 | 38 | 41 | severe delamination moderate chemical etch severe pitting severe waterspotting |

TABLE 3

SUGA Test Results for Comparative Coatings
Coated panels were evaluated following exposure to ultraviolet radiation from a SUGA FS-40 bulb. Surface defects indicated by 3500 hours may have occured before 3500 hours exposure. Defects listed indicate the appearance observed at 3500 hours exposure.

| Coating Composition | Initial Gloss | Gloss per Exposure Time (Hours) | | | | Surface Defects by 3500 Hours Exposure |
|---|---|---|---|---|---|---|
| | | 1000 | 2000 | 2500 | 3000 | |
| 5 | 84 | 84 | 68 | 28 | 26 | slight cracking |
| 6 | 91 | 83 | 83 | — | 27 | moderate waterspotting severe chalking |
| 7 | 91 | 85 | 88 | — | 48 | moderate cracking severe chemical etch severe waterspotting |

TABLE 3-continued

SUGA Test Results for Comparative Coatings
Coated panels were evaluated following exposure to
ultraviolet radiation from a SUGA FS-40 bulb. Surface
defects indicated by 3500 hours may have occured before 3500
hours exposure. Defects listed indicate the appearance
observed at 3500 hours exposure.

| Coating Composition | Initial Gloss | Gloss per Exposure Time (Hours) | | | | Surface Defects by 3500 Hours Exposure |
|---|---|---|---|---|---|---|
| | | 1000 | 2000 | 2500 | 3000 | |
| 8 | 89 | 86 | 68 | — | 60 | moderate cracking severe chemical etch severe waterspotting |
| 9 | 82 | 81 | 82 | 87 | 86 | severe cracking |
| 10 | 86 | 79 | 65 | 53 | 53 | severe cracking |

TABLE 4

Comparative Data for Etch Resistance after 16 Weeks Outdoor
Summer Exposure -Jacksonville, Fla.

| Paint Composition | Etch Rating* |
|---|---|
| 5 | 3 |
| 6 | 3 |
| 7 | 3 |
| 8 | 3 |
| 9 | 3 |
| 10 | 10 |

*The Etch Rating for this test is evaluated on a scale of 0–10, where 0 = best and 10 = worst.

The data set forth in the tables herein above illustrate that the coatings of the present invention compare favorably to the comparison 2-component coating composition containing the lower $T_g$ acrylic and crosslinker mixture of hexamethylene diisocyanate and isophorone diisocyanate.

I claim:

1. A process for coating a substrate comprising
   A. applying to a substrate surface at least one layer of a two-component coating comprising
      i) an acrylic polymer consisting essentially of styrene, acrylic acid and monomers selected from the group consisting of methyl methacrylate, cyclohexyl methacrylate, ethyl hexyl methacrylate, hydroxy propyl methacrylate, isobornyl methacrylate, and mixtures thereof, wherein styrene is used in an amount ≧25% by weight, where said acrylic polymer has a reactive functionality for reaction with a crosslinker and a glass transition temperature ($T_g$) of between 53° C. and 86° C., and
      ii) a crosslinker selected from the group consisting of polyisocyanates and mixtures thereof, and
   B. curing the coating by heating the coated substrate to a temperature of between 115° and 160° C., to form a cured film.

2. A process for coating a substrate by forming a color-plus-clear composite coating, said process comprising
   A. applying at least one pigmented coating to a substrate surface;
   B. applying at least one substantially transparent coating over the pigmented coating layer, wherein the substantially transparent coating is a two-component coating comprising
      i) an acrylic polymer consisting essentially of styrene, acrylic acid and monomers selected from the group consisting of methyl methacrylate, cyclohexyl methacrylate, ethyl hexyl methacrylate, hydroxy propyl methacrylate, isobornyl methacrylate, and mixtures thereof, wherein styrene is used in an amount ≧25% by weight, where said acrylic polymer has a reactive functionality for reaction with a crosslinker and having a glass transition temperature of between 53° C. and 86° C., and
      ii) a crosslinker selected from the group consisting of polyisocyanates and mixtures thereof, and
   C. curing the substantially transparent coating either simultaneously with or subsequent to the pigmented coating layer by heating to a temperature of between 115° and 160° C., to form a cured film.

3. The process of claim 1 or 2, wherein the coating applied in step A comprises acrylic polymer consisting essentially of acrylic acid, ethyl hexyl acrylate and monomers selected from the group consisting of methyl methacrylate, cyclohexyl methacrylate, hydroxy propyl methacrylate, isobornyl methacrylate and mixtures thereof.

4. The process of claim 1, wherein the coating applied in step A comprises acrylic polymer having a molecular weight of between 2,000 and 10,000.

5. The process of claim 1, wherein the coating applied in step A comprises the crosslinker and the polymer in an equivalents ratio, based on a ratio of reactive crosslinker functionality to reactive polymer functionality of from 1.6:1 to 0.4:1.

6. The process of claim 1, wherein the coating applied in step A comprises a film forming acrylic polymer having a functionality selected from the group consisting of hydroxyl and amine functionalities.

7. The process of claim 1, wherein the crosslinker is selected from the group consisting of trifunctional aliphatic isocyanurates, isocyanurates of aliphatic diisocyanates and mixtures thereof.

8. The process of claim 2, wherein the crosslinker is selected from the group consisting of trifunctional aliphatic isocyanurates, isocyanurates of aliphatic diisocyanates and mixtures thereof.

9. A coated article comprising a substrate coated according to the method of claim 1.

10. A process for coating a substrate comprising
   A. applying to a substrate surface at least one layer of a two-component coating comprising
      i) an acrylic polymer consisting essentially of styrene, acrylic acid, ethyl hexyl acrylate and monomers selected from the group consisting of methyl methacrylate, cyclohexyl methacrylate, ethyl hexyl methacrylate, hydroxy propyl methacrylate, isobornyl methacrylate, and mixtures thereof, wherein styrene is used in an amount ≧25% by weight, where said acrylic polymer has a reactive functionality for reaction with a crosslinker and a glass transition temperature ($T_g$) of between 53° C. and 86° C., and
      ii) a crosslinker selected from the group consisting of polyisocyanates and mixtures thereof, and
   B. curing the coating by heating the coated substrate to a temperature of between 115° and 160° C., to form a cured film.

* * * * *

UNITED STATES PATENT AND TRADEMARK OFFICE
CERTIFICATE OF CORRECTION

PATENT NO. : 5,612,415
DATED : March 18, 1997
INVENTOR(S) : Faith S. Loney-Crawford It is certified that error appears in the above-identified patent and that said Letters Patent is hereby corrected as shown below:

On the title page, Item

[75] Inventor:  Faith S. Crawford-Loney

Signed and Sealed this

Twenty-sixth Day of January, 1999

Attest:

Attesting Officer

Acting Commissioner of Patents and Trademarks